(12) United States Patent
     Benson (10) Patent No.: US 10,780,975 B2
(45) Date of Patent: *Sep. 22, 2020

(54) CLIP-ON PROPELLER MOUNT

(71) Applicant: Wing Aviation LLC, Mountain View, CA (US)

(72) Inventor: Stephen Benson, San Jose, CA (US)

(73) Assignee: WING Aviation LLC, Mountain View, CA (US)

( * ) Notice: Subject to any disclaimer, the term of this patent is extended or adjusted under 35 U.S.C. 154(b) by 293 days.

This patent is subject to a terminal disclaimer.

(21) Appl. No.: 16/007,814

(22) Filed: Jun. 13, 2018

(65) Prior Publication Data
US 2019/0329866 A1    Oct. 31, 2019

Related U.S. Application Data

(60) Provisional application No. 62/663,500, filed on Apr. 27, 2018.

(51) Int. Cl.
*B64C 11/04* (2006.01)
*B64C 29/00* (2006.01)
(Continued)

(52) U.S. Cl.
CPC .............. *B64C 11/04* (2013.01); *B64C 11/28* (2013.01); *B64C 27/30* (2013.01);
(Continued)

(58) Field of Classification Search
CPC ......... B64C 11/04; B64C 11/28; B64C 27/30; B64C 29/0016; B64C 29/0025;
(Continued)

(56) References Cited

U.S. PATENT DOCUMENTS 2,021,481 A   11/1935   Dornier
2,369,276 A    8/1943   Cameron et al.
(Continued)

FOREIGN PATENT DOCUMENTS

CN      206569266 U    10/2017
CN     2069390504 U     1/2018
(Continued)

OTHER PUBLICATIONS

Benson at al. (Pub No. US 2019/0329866 A1); Pub date Oct. 31, 2019.

(Continued)

*Primary Examiner* — Rodney A Bonnette
(74) *Attorney, Agent, or Firm* — Christensen O'Connor Johnson Kindness PLLC (57) ABSTRACT

A propulsion unit includes a motor rotor, a clip-in base mount, a clip-in rotor cap, propeller mounts, and propeller blades. The motor rotor spins about a central rotational axis. The clip-in base mount is disposed on the motor rotor. The clip-in rotor cap is shaped to mate with and detachably clip into the clip-in base mount. The propeller mounts are attached to the clip-in rotor cap. The propeller blades each have a proximal base and a distal tip. The proximal base of each propeller blade mounts to a corresponding one of the propeller mounts.

19 Claims, 8 Drawing Sheets

(51) Int. Cl.
*B64C 39/02* (2006.01)
*B64C 11/28* (2006.01)
*B64C 27/30* (2006.01)

(52) U.S. Cl.
CPC ...... *B64C 29/0016* (2013.01); *B64C 29/0025* (2013.01); *B64C 39/024* (2013.01); *B64C 2201/02* (2013.01); *B64C 2201/10* (2013.01); *B64C 2201/104* (2013.01); *B64C 2201/108* (2013.01); *B64C 2201/165* (2013.01)

(58) Field of Classification Search
CPC .............. B64C 39/024; B64C 2201/02; B64C 2201/2201; B64C 2201/10; B64C 2201/104; B64C 2201/108; B64C 2201/165
See application file for complete search history.

(56) References Cited

U.S. PATENT DOCUMENTS

| | | |
|---|---|---|
| 3,592,412 A | 7/1971 | Glatfelter |
| 4,204,806 A | 5/1980 | Blanchard |
| 5,183,384 A | 2/1993 | Trumbly |
| 6,371,726 B1 | 4/2002 | Jonsson et al. |
| 7,118,066 B2 | 10/2006 | Allen |
| 7,159,817 B2 | 1/2007 | VanderMey et al. |
| 9,694,911 B2 | 7/2017 | Bevirt et al. |
| 2004/0118970 A1 | 6/2004 | Muylaert et al. |
| 2010/0243820 A1* | 9/2010 | Lim ........................ B64C 27/24 244/7 A |
| 2016/0001879 A1 | 1/2016 | Johannesson et al. |
| 2016/0347446 A1 | 12/2016 | Vetter et al. |
| 2017/0106978 A1 | 4/2017 | Sopper et al. |
| 2017/0240267 A1* | 8/2017 | Tao ........................ B64C 11/04 |
| 2019/0092461 A1 | 3/2019 | Duffy et al. |
| 2019/0193834 A1* | 6/2019 | Deng ..................... B64D 35/00 |
| 2019/0256204 A1* | 8/2019 | Sun ........................ B64C 27/08 |
| 2019/0329866 A1 | 10/2019 | Benson |

FOREIGN PATENT DOCUMENTS

| | | |
|---|---|---|
| CN | 107719659 A | 2/2018 |
| WO | 2005086563 A2 | 9/2005 |

OTHER PUBLICATIONS

International Search Report for corresponding International Patent Application No. PCT/US2019/029007, dated Aug. 29, 2019, 12 pages.

Non-Final Office Action dated May 29, 2020 in U.S. Appl. No. 16/007,809, filed Jun. 13, 2018, 14 pages.

* cited by examiner

CLIP-ON PROPELLER MOUNT

CROSS-REFERENCE TO RELATED APPLICATIONS

This application claims the benefit of U.S. Provisional Application No. 62/663,500, filed Apr. 27, 2018, which is hereby incorporated by reference in its entirety. The present application is also related to U.S. application Ser. No. 16/007,809 filed on Jun. 13, 2018 and entitled, "Passively Folding Propeller Blades for Drag Reduction.

TECHNICAL FIELD

This disclosure relates generally to propeller blade mounts, and in particular but not exclusively, relates to propeller blade mounts for unmanned aerial vehicles.

BACKGROUND INFORMATION

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Unmanned aerial vehicles (UAVs) or drones are becoming more popular in general. As their designs are refined and their capabilities expanded, their suitability for commercial use is expected to expand. Designs that improve the efficiency and endurance of UAVs will expand their mission capabilities.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of an apparatus, system, and method of operation for passively folding propeller blades to reduce drag resistance are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments disclosed herein describe mechanical structures and techniques for pivot mounting propeller blades to a motor rotor that enable passive folding of the propeller blades from a deployed position when in use to a stowed position when idle. The stowed position provides reduced drag during forward flight. The folding of the propeller blades to the stowed position is passively achieved by wind resistance while pivoting back to the deployed position is achieved via centrifugal force due to offset positioning of pivot mounts from the central rotational axis of the motor rotor.

While the propeller blade mounts are applicable for use in a variety of vehicle applications, the described techniques are particularly useful in applications having separate propulsion units for horizontal and vertical propulsion where the vertical takeoff and landing propulsion is idle during horizontal cruise.

Figure 1:
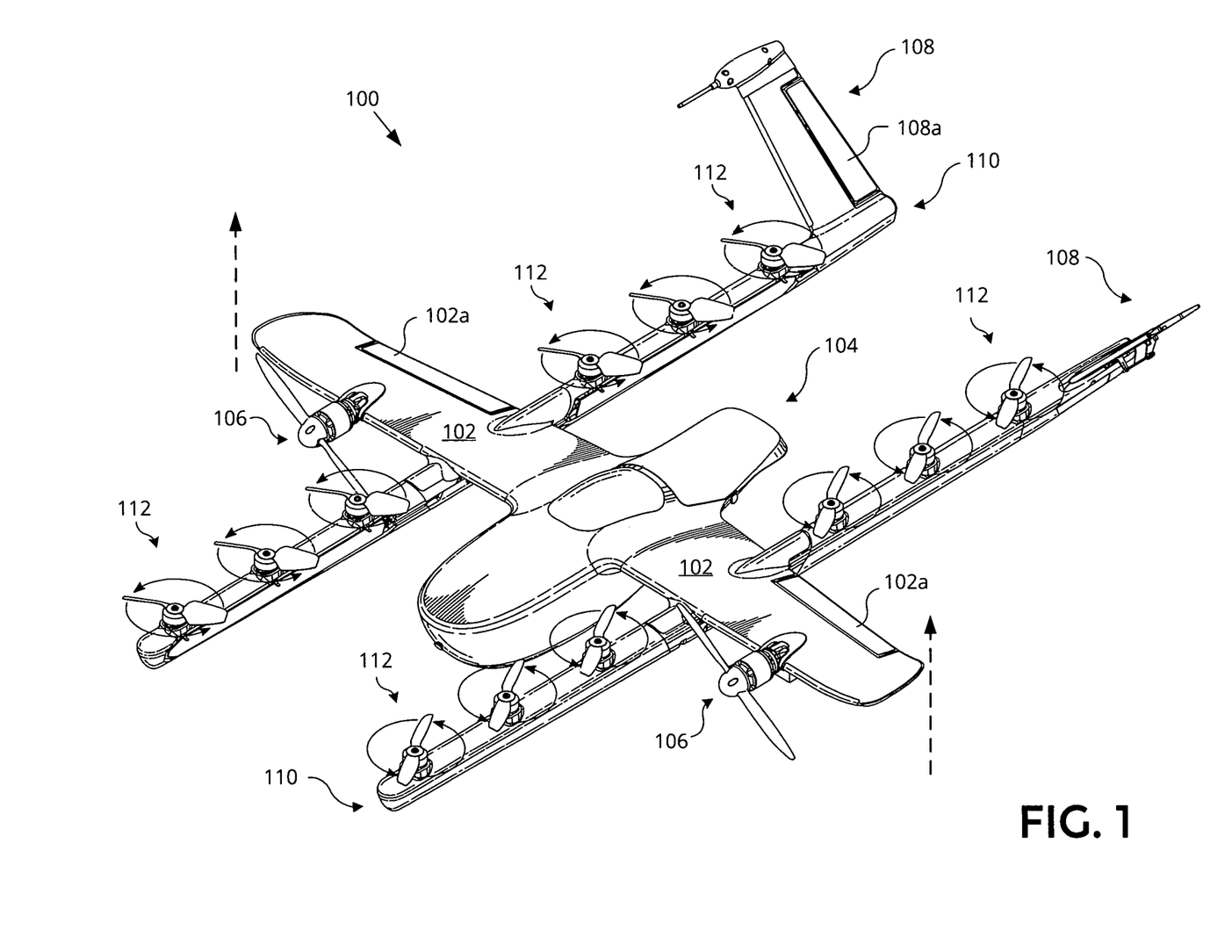
FIG. 1 is a perspective view illustration of an aerial vehicle with propeller blades of vertical propulsion units in a deployed position, in accordance with an embodiment of the disclosure.
Figure 2:
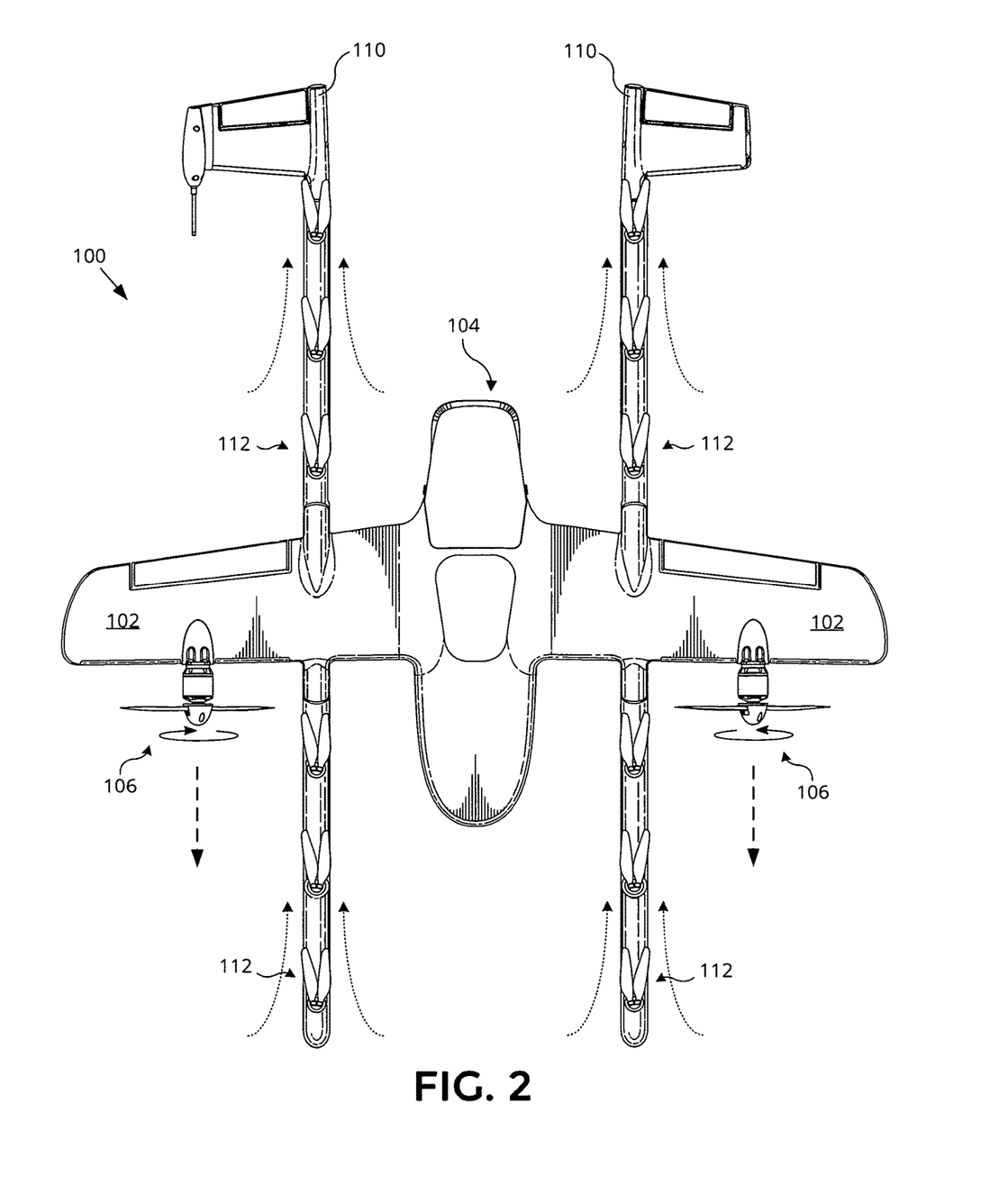
FIG. 2 is a plan view illustration of an aerial vehicle with propeller blades of vertical propulsion units in a stowed position, in accordance with an embodiment of the disclosure.

FIGS. 1 and 2 illustrate an aerial vehicle 100, in accordance with an embodiment of the disclosure. The illustrated embodiment of aerial vehicle 100 is a vertical takeoff and landing (VTOL) unmanned aerial vehicle (UAV) that includes separate propulsion units 106 and 112 for providing horizontal and vertical propulsion, respectively. Aerial vehicle 100 is a fixed-wing aerial vehicle, which as the name implies, has a wing assembly 102 that can generate lift based on the wing shape and the vehicle's forward airspeed when propelled horizontally by propulsion units 106. FIG. 1 is a perspective view illustration of aerial vehicle 100 operating during a vertical takeoff or landing with the propeller blades of vertical propulsion units 112 deployed to provide vertical propulsion. FIG. 2 is a plan view illustration of aerial vehicle 100 operating in a horizontal cruise mode with the propeller blades of vertical propulsion units 112 idle (i.e., not spinning) and stowed to reduce a drag profile during forward motion. As illustrated, the propeller blades of vertical propulsion units 112 are stowed and passively align for reduced drag due to wind resistance resulting from the forward motion of aerial vehicle 100. In contrast, the propeller blades of vertical propulsion units 112 are deployed in FIG. 1 due to centrifugal forces when vertical propulsion units 112 are spinning.

The illustrated embodiment of aerial vehicle 100 has an airframe that includes a fuselage 104 and wing assembly 102. In one embodiment, fuselage 104 is modular and includes a battery module, an avionics module, and a mission payload module. These modules may be detachable from each other and mechanically securable to each other to contiguously form at least a portion of the fuselage or main body.

The battery module includes a cavity for housing one or more batteries for powering aerial vehicle 100. The avionics module houses flight control circuitry of aerial vehicle 100, which may include a processor and memory, communication electronics and antennas (e.g., cellular transceiver, wifi transceiver, etc.), and various sensors (e.g., global positioning sensor, an inertial measurement unit (IMU), a magnetic compass, etc.). The mission payload module houses equipment associated with a mission of aerial vehicle 100. For example, the mission payload module may include a payload actuator for holding and releasing an externally attached payload. In another embodiment, the mission payload module may include a camera/sensor equipment holder for carrying camera/sensor equipment (e.g., camera, lenses, radar, lidar, pollution monitoring sensors, weather monitoring sensors, etc.).

As illustrated, aerial vehicle 100 includes horizontal propulsion units 106 positioned on wing assembly 102, which can each include a motor, a motor rotor with shaft, and propeller blades, for propelling aerial vehicle 100 horizontally. The illustrated embodiment of aerial vehicle 100 further includes two boom assemblies 110 that secure to wing assembly 102. Vertical propulsion units 112 are mounted to boom assemblies 110. Vertical propulsion units 112 can each also include a motor, a motor rotor with shaft, and propeller blades, for providing vertical propulsion. As mentioned above, vertical propulsion units 112 may be used during a hover mode where aerial vehicle 100 is descending (e.g., to a delivery location), ascending (e.g., following a delivery), or maintaining a constant altitude. Stabilizers 108 (or tails) may be included with aerial vehicle 100 to control pitch and stabilize the aerial vehicle's yaw (left or right turns) during cruise. In some embodiments, during cruise mode vertical propulsion units 112 are disabled and during hover mode horizontal propulsion units 106 are disabled. In other embodiments, vertical propulsion units 112 are merely powered low during cruise mode and/or horizontal propulsion units 106 are merely powered low during hover mode.

During flight, aerial vehicle 100 may control the direction and/or speed of its movement by controlling its pitch, roll, yaw, and/or altitude. Thrust from horizontal propulsion units 106 is used to control air speed. For example, the stabilizers 108 may include one or more rudders 108a for controlling the aerial vehicle's yaw, and wing assembly 102 may include elevators for controlling the aerial vehicle's pitch and/or ailerons 102a for controlling the aerial vehicle's roll. As another example, increasing or decreasing the speed of all the propeller blades simultaneously can result in aerial vehicle 100 increasing or decreasing its altitude, respectively.

Many variations on the illustrated fixed-wing aerial vehicle are possible. For instance, aerial vehicles with more wings (e.g., an "x-wing" configuration with four wings), are also possible. Although FIGS. 1 and 2 illustrate one wing assembly 102, two boom assemblies 110, two horizontal propulsion units 106, and six vertical propulsion units 112 per boom assembly 110, it should be appreciated that other variants of aerial vehicle 100 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

Figure 3:
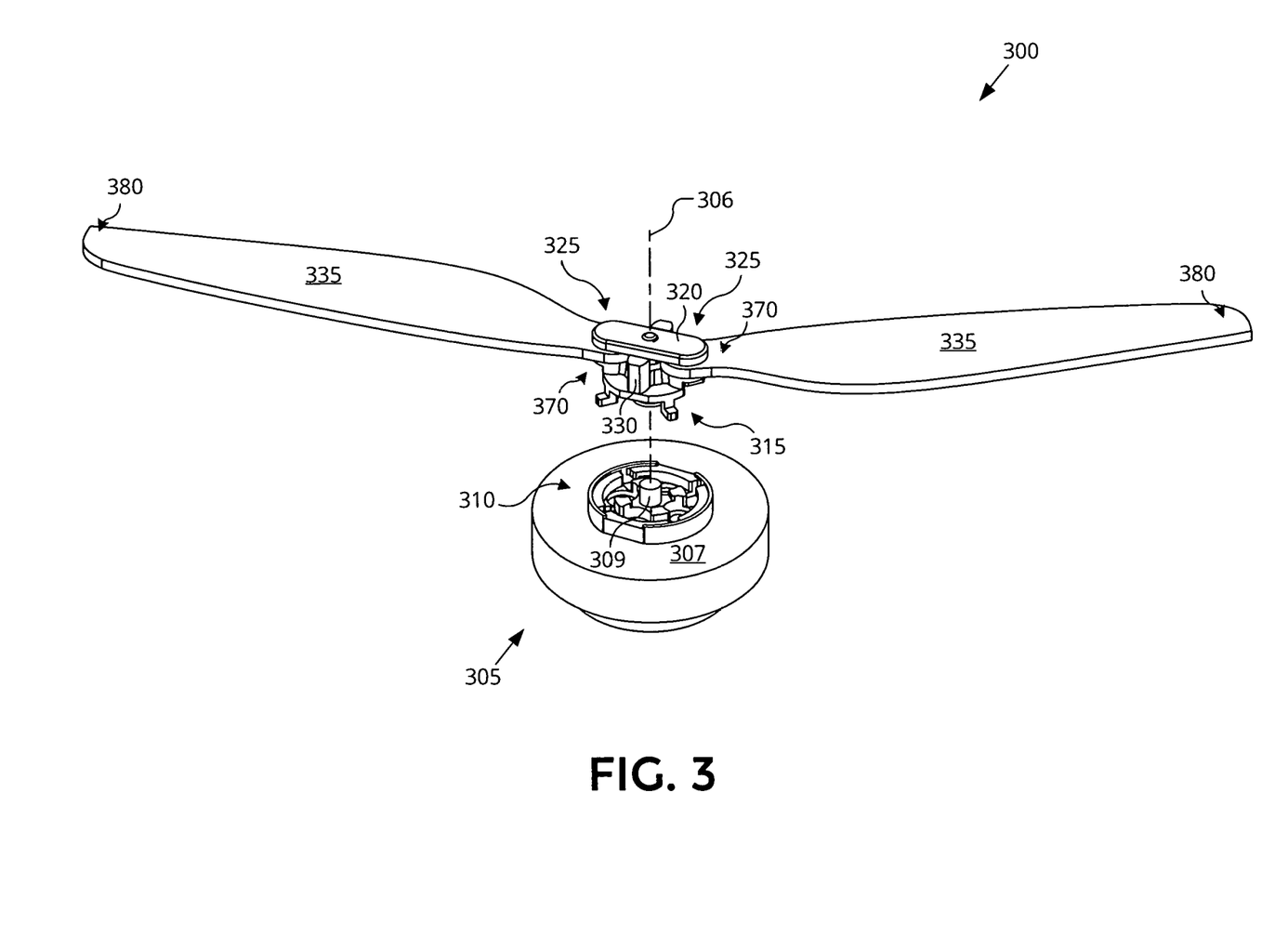
FIG. 3 is a perspective view illustration of a subassembly for coupling propeller blades to a motor rotor including a clip-in rotor cap that mates to a clip-in base mount, in accordance with an embodiment of the disclosure.
Figure 4:
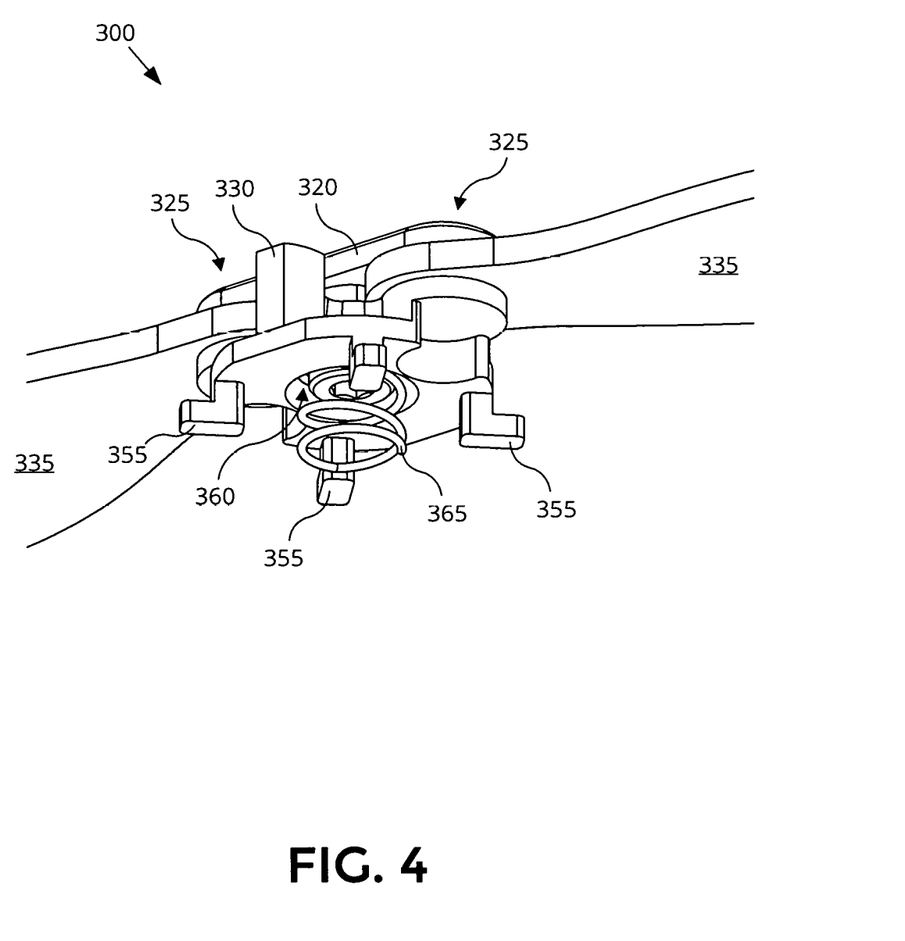
FIG. 4 is a perspective view illustration of the subassembly including an underside view of the clip-in rotor cap, in accordance with an embodiment of the disclosure.
Figure 5:
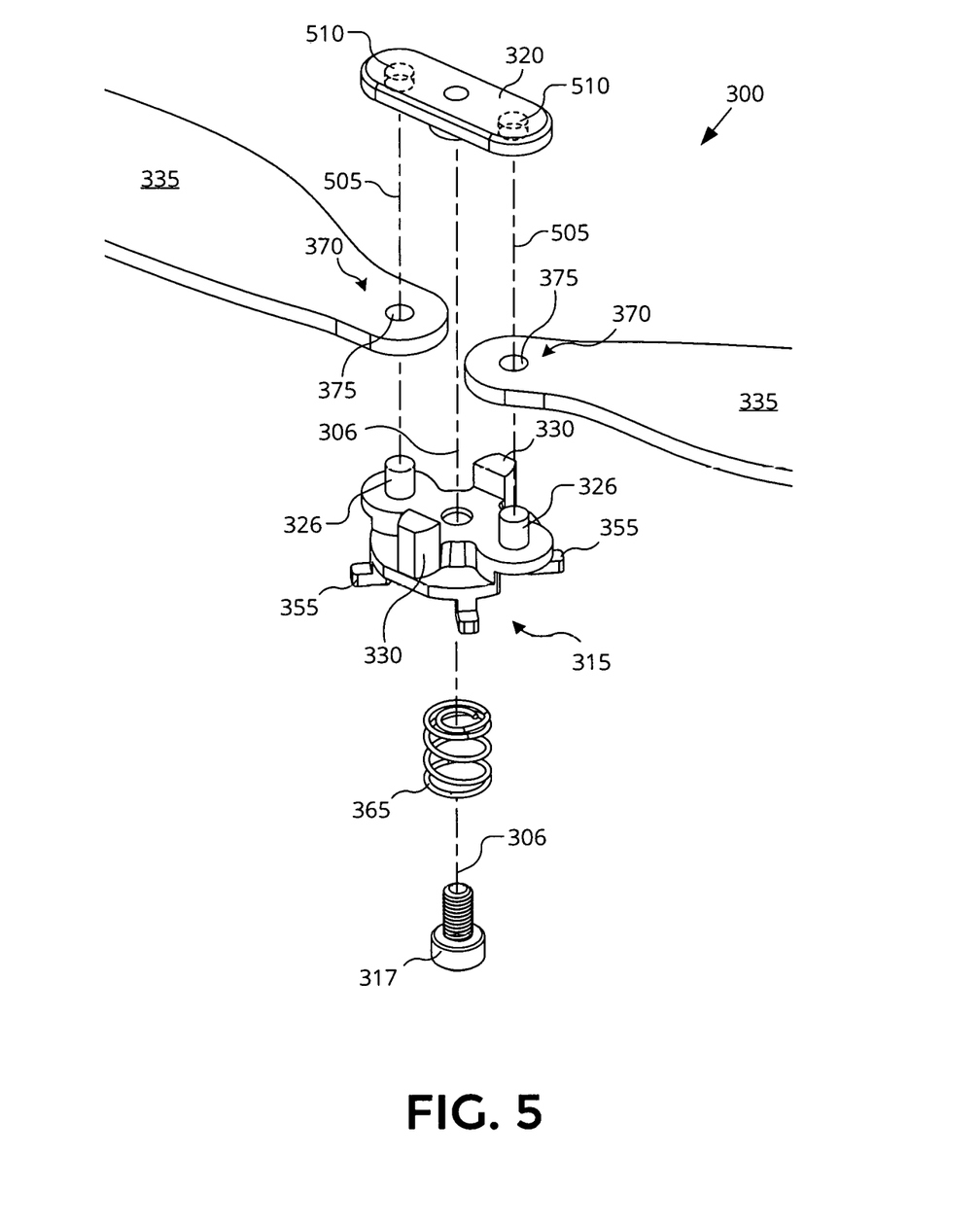
FIG. 5 is an exploded view illustration of the subassembly including the clip-in rotor cap, in accordance with an embodiment of the disclosure.
Figure 6A:
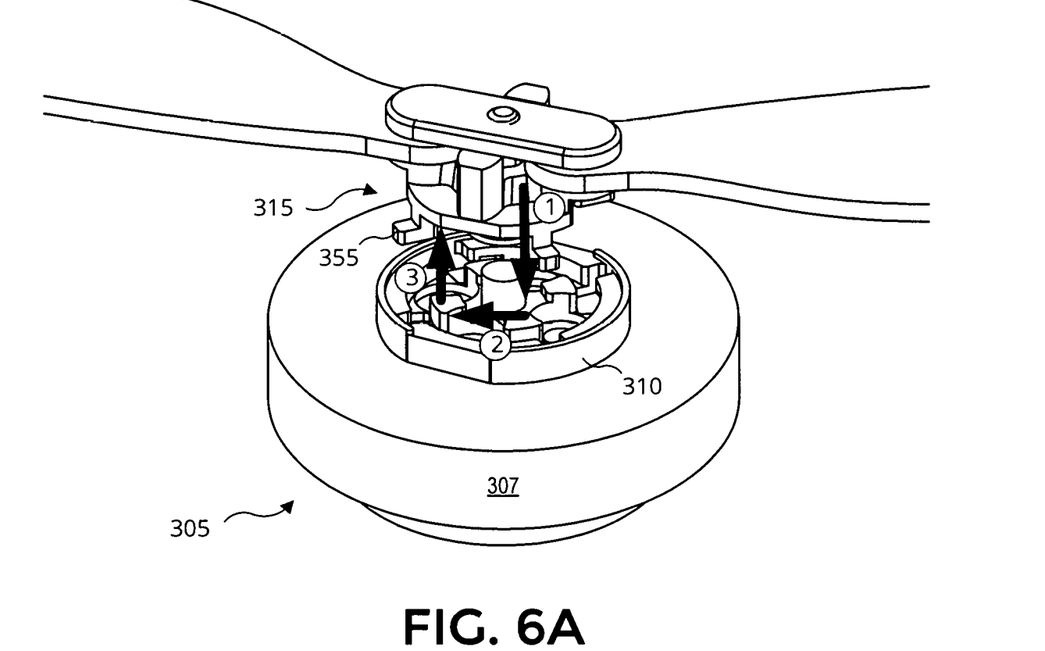
FIG. 6A is a perspective view illustration showing how the clip-in rotor cap attaches to the clip-in base mount, in accordance with an embodiment of the disclosure.

FIGS. 3, 4, 5, 6A, and 6B are different views illustrating various aspects of a subassembly 300 of a propulsion unit (e.g., a vertical propulsion unit 112) for coupling propeller blades to a motor rotor, in accordance with an embodiment of the disclosure. FIGS. 3 and 6A are top perspective views, FIG. 4 a bottom perspective view, and FIG. 5 is an exploded view of subassembly 300. The illustrated embodiment of subassembly 300 includes a motor rotor 305, a clip-in base mount 310, a holder base 315, a holder cap 320, pivot mounts 325, stop blocks 330, propeller blades 335, and a mechanical fastener 317. The illustrated embodiment of clip-in base mount 310 includes a raised alignment ring 340, cam grooves 345, and detents 350 (see FIG. 6B). The illustrated embodiment of holder base 315 includes holding cams 355, a spring cavity 360, and a spring 365 (see FIG. 4). The illustrated embodiment of propeller blades 335 includes a proximal base 370, a hole 375 in proximal base 370, and a distal tip 380 (see FIGS. 3 and 5). The motor rotor 305 includes a cover plate 307 connected to a shaft 309 both of which rotate together.

Referring to FIG. 5, pivot mounts 325 are implemented as bearings 326 that slide through holes 375 in propeller blades 335 and mate with recesses 510 in holder cap 320. Bearings 326 constrain the motion of propeller blades 335 to a rotation about offset pivoting axes 505. Offset pivoting axes 505 are substantially parallel to, but physically offset from, a central rotational axis 306 about which motor rotor 305 turns. Bearings 326 extend between holder base 315 and holder cap 320 along offset pivoting axes 505. Holes 375 in proximal bases 370 slide over and fit around bearings 325. In the illustrated embodiment, bearings 326 are cylindrical bosses attached to holder base 315, which secure into recesses 510 in holder cap 320. In one embodiment, holder base 315 along with bearings 326 is fabricated of metal (e.g., aluminum) while propeller blades 335 are fabricated of plastic. In one embodiment, the holder base 315 along with bearings 326 is anodized and/or coated with polytetrafluoroethylene (PTFE) to improve wear characteristics. In other embodiments, one or more of the components may be fabricated of carbon fiber reinforced polymer.

Holder cap 320 operates not only to support the top sides of bearings 326 but also clamps propeller blades 335 between holder base 315 and holder cap 320. In the illustrated embodiment, a single mechanical fastener 317 threads into a single female threaded boss on holder cap 320 along central rotational axis 306 to provide the clamping force. In other embodiments, bearings 326 may be implemented as female threaded bosses and a pair of mechanical fasteners may be threaded through holder cap 320 into the threaded bosses along offset pivoting axes 505 (e.g., see FIG. 7). The length of bearings 326 relative to the thickness of proximal bases 370 of propeller blades 335 is selected to allow propeller blades 335 to freely pivot about offset pivoting axes 505 without permitting undue slop or dihedral bending.

While motor rotor 305 is spinning about central rotational axis 306, propeller blades 335 pivot about offset pivoting axes 505 to their deployed position. Stop blocks 330 are mounted between propeller blades 335 at different circumferential positions to limit the amount of pivoting of propeller blades 335 in either rotational direction about offset pivoting axes 505. When motor rotor 305 commences rotation at initial spin up, stop blocks 330 push against the trailing edge of propeller blades 335 to initiate their rotational motion about central rotational axis 306. Once propeller blades 335 are spinning, centrifugal forces takeover and propeller blades 335 pivot to their deployed positions due to the offset position of pivot mounts 325. In the illustrated embodiment, the surfaces of stop blocks 330 that contact propeller blades 335 have curvatures that mate to the local curvatures of propeller blades 335 to distribute the forces on propeller blades 335 over a larger area. In one embodiment, the contacting surfaces of stop blocks 330 are fabricated of a material that is softer than propeller blades 335 to reduce dents on or damage to propeller blades 335. For example, stop blocks 330 may have a rubberized coating, a plastic coating, or otherwise.

While motor rotor 305 is idle (i.e., not spinning) during cruising of aerial vehicle 100, wind resistance causes propeller blades 335 to pivot about offset pivoting axes 505 to the stowed position. The wind resistance and free rotational motion of propeller blades 335 at pivot mounts 325 allows propeller blades 335 to passively align with the wind to reduce their cross-sectional area heading into the wind thereby reducing their drag profile. Stop blocks 330 are sized such that the given stop block 330 that comes to a rest in the downwind position also serves to prevent the aerodynamic surfaces (e.g., lifting surfaces, trailing edge, leading edge, etc.) of propeller blades 335 from contacting each other in the stowed position. This prevents binding, marring, or other damage to the aerodynamic surfaces on propeller blades 335. Although FIGS. 4 and 5 illustrate stop blocks 330 integrated into holder base 315, in other embodiments, the stop blocks may be integrated into the holder cap (e.g., see FIGS. 8A and 8B). In yet other embodiments, the stop blocks may be formed into the proximal bases 370 of propeller blades 335 (not illustrated).

Figure 6B:
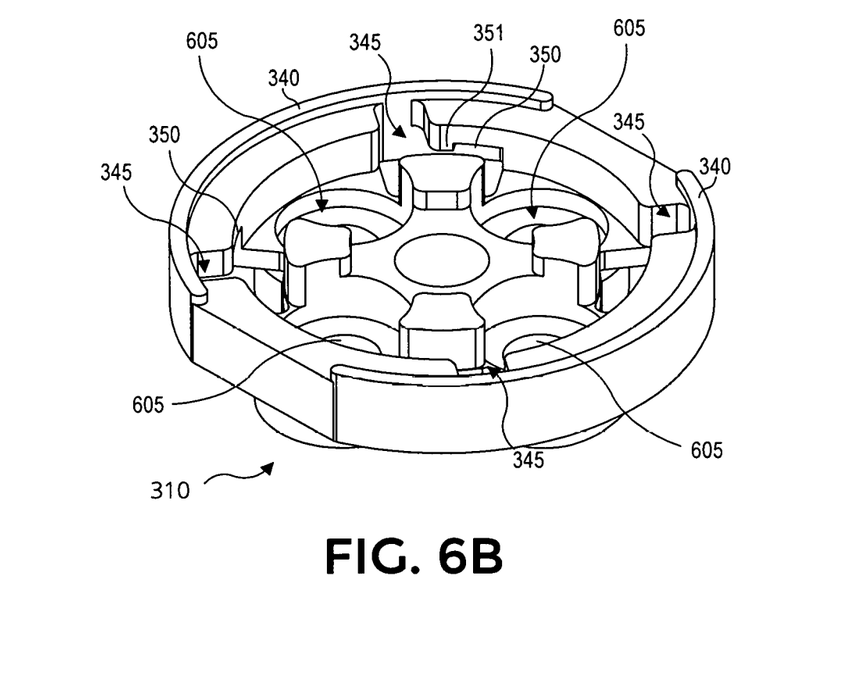
FIG. 6B is a perspective view illustration of the clip-in base mount, in accordance with an embodiment of the disclosure.

The illustrated embodiment of subassembly 300 is a clip-in embodiment that attaches propeller blades 335 to motor rotor 305 by hand in the field without the need of a tool. Accordingly, holder base 315 is also referred to as a clip-in rotor cap 315 since it clips onto and caps over the motor rotor 305. Referring to FIGS. 4, 6A and 6B, clip-in rotor cap 315 (a.k.a. holder base 315), includes holding cams 355 that mate to cam grooves 345 disposed in clip-in base mount 310. Holding cams 355 are mechanically linkages that slide in cam grooves 345. In the illustrated embodiment, each holding cam 355 is a sort of foot or L-shaped bracket that protrudes from the backside of clip-in rotor cap 315 that faces clip-in base mount 310. As illustrated in FIG. 6A, clip-in rotor cap 315 detachably clips (mates) into clip-in base mount 310 with a three part motion: (1) align holding cams 355 to cam grooves 345 and push the components together to overcome the repelling force from spring 365, (2) twist clip-in rotor cap 315 relative to clip-in base mount 310, and (3) release clip-in rotor cap 315 such that spring 365 forces holding cams 355 into detents 350. With reference to FIGS. 4 and 5, spring 365 is disposed within spring cavity 360 and secured in place by mechanical fastener 317 at the tight curl end of spring 365. Alignment ring 340 (FIG. 6B) extends around the perimeter of clip-in base mount 310 and provides an alignment structure and shear force retention for clip-in rotor cap 315.

In one embodiment, clip-in rotor cap 315 and clip-in base mount 310 are designed to provide automatic "pop off" separation in the event of a propeller blade collision with a physical object having a threshold mass. For example, in one embodiment, detents 350 have beveled stops (only abrupt 90 degree stops 351 are illustrated) and the spring rate of spring 365 selected such that a sufficient rotational force will separate clip-in rotor cap 315 along with propeller blades 335 from motor rotor 305 and clip-in base mount 310. The direction of rotational separation of holding cams 355 out of grooves 345 is selected to be opposite the rotational direction of motor rotor 305 during operation. In this manner, impact of propeller blade 335 with a stationary physical object can provide the correct impulse force and rotational direction to separate clip-in rotor cap 315. The angle of the beveled stop (along with its slope direction) and the spring rate may be select such that pop off occurs before propeller blades 335 are damaged by impact or before severe injury to a human hand occurs should the physical object impacted be a hand or finger. As illustrated in the embodiment of FIGS. 6A and 6B, clip-in base mount 310 is secured to motor rotor 305 with mechanical fasteners (e.g., four) through screw holes 605.

Figure 7:
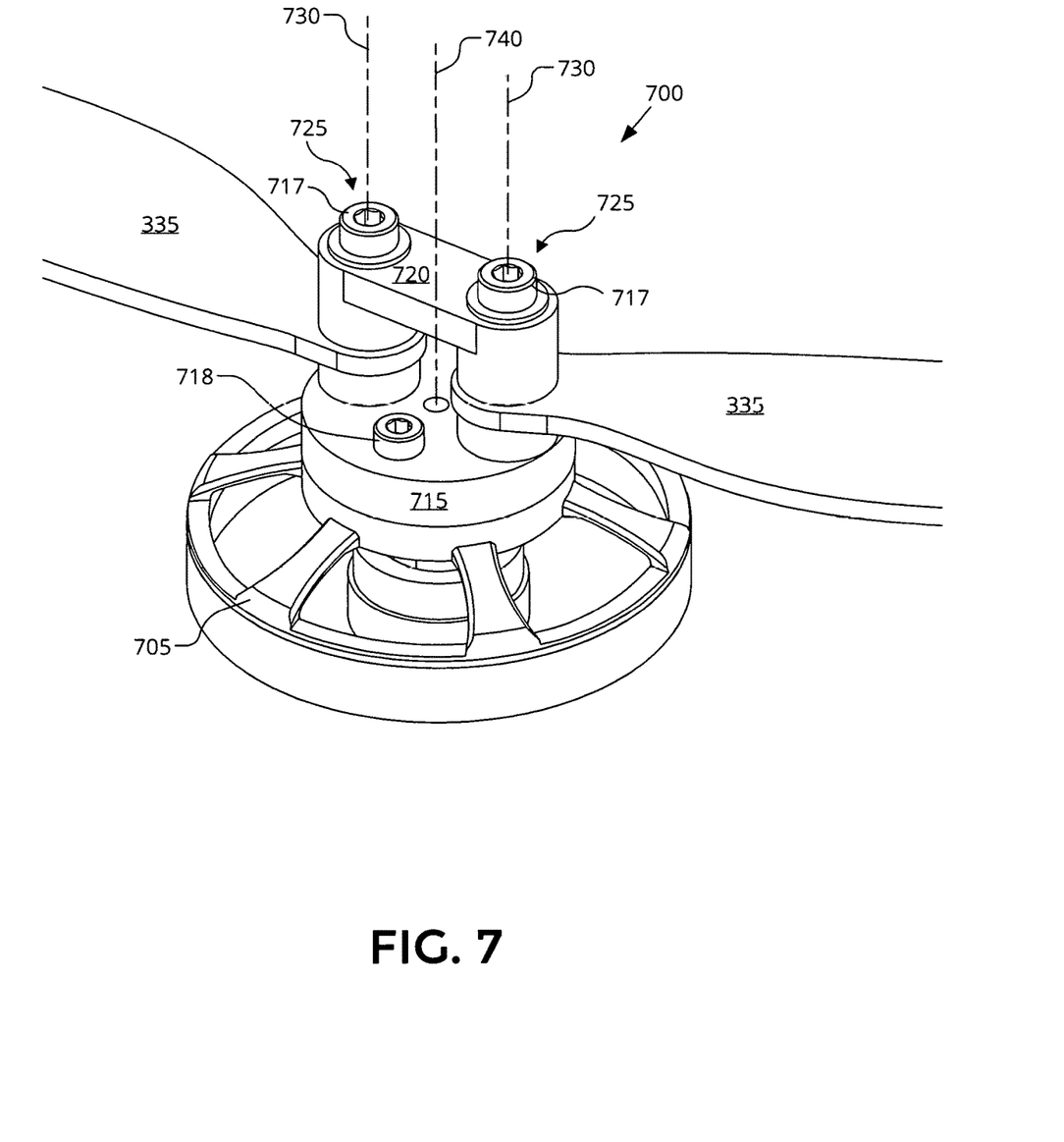
FIG. 7 is a perspective view illustration of a subassembly for coupling propeller blades to a motor rotor, in accordance with an embodiment of the disclosure.

FIG. 7 is a perspective view illustration of another subassembly 700 for coupling propeller blades 335 to a motor rotor 705, in accordance with an embodiment of the disclosure. The illustrated embodiment of subassembly 700 includes motor rotor 705, a holder base 715, a holder cap 720, pivot mounts 725, and mechanical fasteners 717 and 718. Subassembly 700 operates in a similar manner as subassembly 300 to secure propeller blades 335 to motor rotor 705 using pivot mounts 725 at offset pivoting axes 730 that are substantially parallel to but offset from central rotational axis 740. However, pivot mounts 725 are bearings fabricated from female threaded bosses extending from holder base 715. Holder cap 720 is secured over the female threaded bosses with mechanical fasteners 717 that thread through holder cap 720 into the female threaded bosses. Although motor rotor 705 is illustrated as having a hub, spoke, and rim cover plate, it should be appreciated that the cover plates of motor rotors 305 or 705 may assume this shape or otherwise.

Figure 8A:
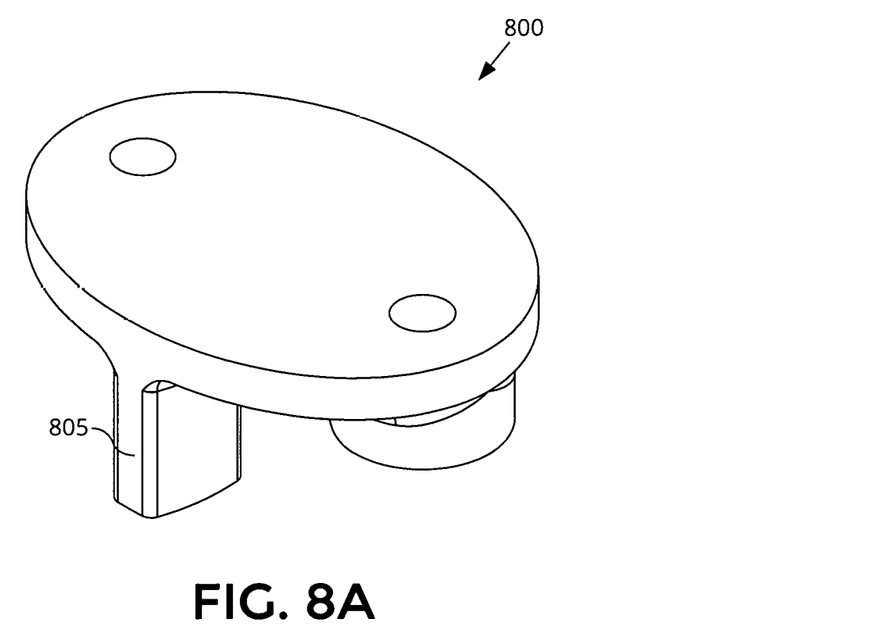
FIGS. 8A and 8B are perspective view illustrations of a holder cap, in accordance with an embodiment of the disclosure.
Figure 8B:
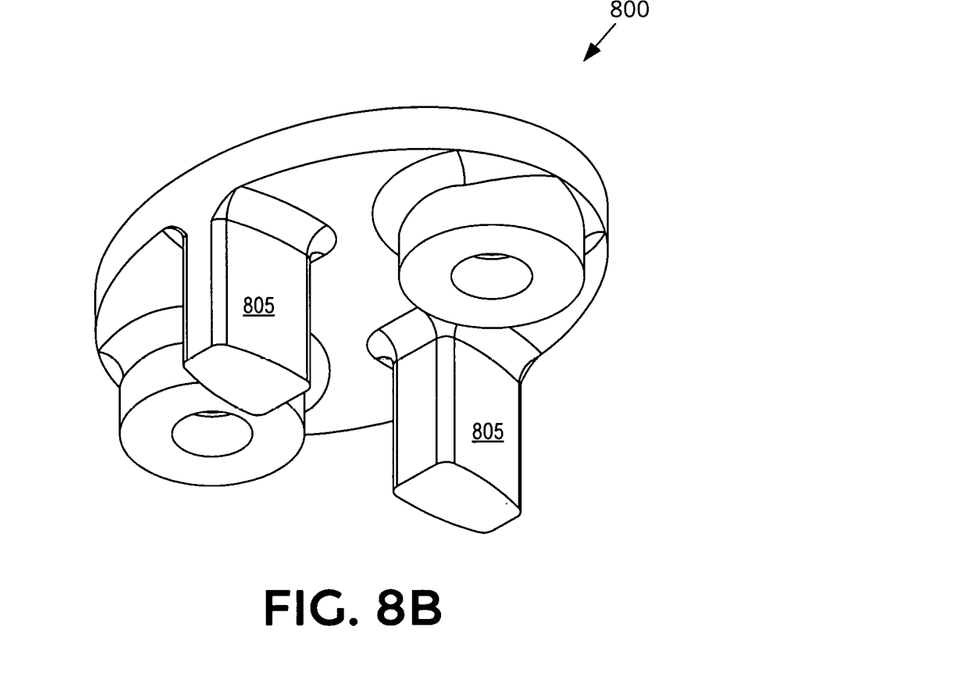

FIGS. 8A and 8B are perspective view illustrations of a holder cap 800, in accordance with an embodiment of the disclosure. Holder cap 800 includes integrated stop blocks 805. Holder cap 800 may be used in connection with either of subassemblies 300 or 700 to replace their illustrated holder caps 320 or 720, respectively.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A propulsion unit, comprising:
a motor rotor that spins about a central rotational axis;
a clip-in base mount disposed on the motor rotor;
a clip-in rotor cap shaped to mate with and detachably clip into the clip-in base mount;
propeller mounts attached to the clip-in rotor cap; and
propeller blades each having a proximal base and a distal tip, wherein the proximal base of each propeller blade mounts to a corresponding one of the propeller mounts.

2. The propulsion unit of claim 1, wherein the clip-in base mount includes one or more cam grooves and the clip-in rotor cap includes holding cams that mate to the one or more cam grooves.

3. The propulsion unit of claim 2, wherein the clip-in rotor cap is attachable to the clip-in base mount by hand without a tool.

4. The propulsion unit of claim 2, wherein the clip-in rotor cap further includes:
a spring cavity; and
a spring disposed in the spring cavity that asserts a repelling force between the clip-in base mount and the clip-in rotor cap when the clip-in rotor cap is mated to the clip-in base mount.

5. The propulsion unit of claim 2, wherein the clip-in base mount further comprises:
detents disposed in the one or more cam grooves to provide resistance to a rotational separation of the holding cams from the one or more cam grooves.

6. The propulsion unit of claim 5, wherein the detents each comprise a beveled stop in the one or more cam grooves.

7. The propulsion unit of claim 6, wherein a slope direction of the beveled stop along with a direction of the rotational separation of the holding cams from the one or more grooves enables a pop off separation of the clip-in rotor cap and the propeller blades from the motor rotor in an event that a physical object of a threshold mass impacts one or more of the propeller blades when the propeller blades are spinning.

8. The propulsion unit of claim 7, wherein the one or more cam grooves are disposed along inside edges of the raised alignment ring.

9. The propulsion unit of claim 2, wherein the clip-in base mount further comprises:
a raised alignment ring extending at least partially around a perimeter of the clip-in base mount.

10. An aerial vehicle, comprising:
an airframe;
propulsion units mounted to the airframe to provide propulsion to the aerial vehicle, wherein one or more of the propulsion units includes:
a motor rotor that spins about a central rotational axis;
a clip-in base mount disposed on the motor rotor;
a clip-in rotor cap shaped to mate with and detachably clip into the clip-in base mount;
propeller mounts attached to the clip-in rotor cap; and
propeller blades each having a proximal base and a distal tip, wherein the proximal base of each propeller blade mounts to a corresponding one of the propeller mounts.

11. The aerial vehicle of claim 10, wherein the clip-in base mount includes one or more cam grooves and the clip-in rotor cap includes holding cams that mate to the one or more cam grooves.

12. The aerial vehicle of claim 11, wherein the clip-in rotor cap is attachable to the clip-in base mount by hand without a tool.

13. The aerial vehicle of claim 11, wherein the clip-in rotor cap further includes:
a spring cavity; and
a spring disposed in the spring cavity that asserts a repelling force between the clip-in base mount and the clip-in rotor cap when the clip-in rotor cap is mated to the clip-in base mount.

14. The aerial vehicle of claim 11, wherein the clip-in base mount further comprises:
detents disposed in the one or more cam grooves to provide resistance to a rotational separation of the holding cams from the one or more cam grooves.

15. The aerial vehicle of claim 14, wherein the detents each comprise a beveled stop in the one or more cam grooves.

16. The aerial vehicle of claim 15, a slope direction of the beveled stop along with a direction of the rotational separation of the holding cams from the one or more grooves enables a pop off separation of the clip-in rotor cap and the propeller blades from the motor rotor in an event that a physical object of a threshold mass impacts one or more of the propeller blades when the propeller blades are spinning.

17. The aerial vehicle of claim 16, wherein the one or more cam grooves are disposed along inside edges of the raised alignment ring.

18. The aerial vehicle of claim 11, wherein the clip-in base mount further comprises:
a raised alignment ring extending at least partially around a perimeter of the clip-in base mount.

19. The aerial vehicle of claim 10, wherein the aerial vehicle comprises a vertical takeoff and landing (VTOL) unmanned aerial vehicle (UAV) and the propulsion units include horizontal propulsion units mounted to the airframe to provide horizontal propulsion and vertical propulsion units mounted to the airframe to provide vertical propulsion.

\* \* \* \* \*